United States Patent [19]

Fischer et al.

[11] 4,196,751
[45] Apr. 8, 1980

[54] ELECTRIC TO FLUID SIGNAL VALVE UNIT

[75] Inventors: Donn R. Fischer, Mequon; Wesley W. Rineck, Milwaukee, both of Wis.

[73] Assignee: Johnson Controls, Inc., Milwaukee, Wis.

[21] Appl. No.: 649,273

[22] Filed: Jan. 15, 1976

[51] Int. Cl.² .................................................. F16K 31/06
[52] U.S. Cl. ............................... 137/625.65; 251/129; 251/141
[58] Field of Search ................. 251/141, 129, 139, 30; 137/625.64, 625.65

[56] References Cited

U.S. PATENT DOCUMENTS

| | | | |
|---|---|---|---|
| 2,289,456 | 7/1942 | Ray | 251/141 X |
| 2,783,021 | 2/1957 | Bickley | 251/141 X |
| 3,001,549 | 9/1961 | Nelson et al. | 251/139 X |
| 3,218,022 | 11/1965 | Lewis | 251/30 |
| 3,521,854 | 7/1970 | Leiber et al. | 251/141 X |
| 3,618,333 | 11/1971 | Pedersen et al. | 62/217 |
| 3,645,293 | 2/1972 | Pedersen | 137/861 |
| 3,662,779 | 5/1972 | Weber | 137/489 |
| 3,734,117 | 5/1973 | Atkinson | 137/82 |
| 3,817,488 | 6/1974 | Mack | 251/141 X |
| 3,873,060 | 3/1975 | Espenschied et al. | 251/129 |
| 3,921,670 | 11/1975 | Clippard et al. | 251/129 X |
| 3,937,242 | 2/1976 | Eckert | 251/129 X |
| 3,942,759 | 3/1976 | Passera et al. | 251/129 |

FOREIGN PATENT DOCUMENTS 762876 12/1956 United Kingdom ..................... 251/141

*Primary Examiner*—Arnold Rosenthal
*Attorney, Agent, or Firm*—Andrus, Sceales, Starke & Sawall

[57] ABSTRACT

A low-powered electric to fluid valve unit includes a housing having a supply port connected to a pneumatic source and an output port connected to a pneumatic operator. A disc spring is clamped about the periphery within the housing. The peripheral portion is connected by a plurality of spring arms to a sealing disc located between the inner end of the supply port and an exhaust port. The disc spring is formed of a suitable spring material which may be of a magnetic or non-magnetic material. The disc is coated with a silicone rubber sealant. The housing is closed by an electromagnetic assembly threaded into the housing and having an E-shaped iron core having a coil wound about the central leg and connected to a signal source. The central core leg is formed with an exhaust opening and aligned with the spring disc. An iron pad is provided on the backside of the spring disc and is spaced slightly from the E-shaped iron core to define a working air gap. The pad provides a relatively large cross-sectional flux path for the magnetic field. The housing is formed of plastic components for ease of production. When the magnetic field starts movement of the spring, the air gap shortens and the spring snaps to close the exhaust port and open the supply port. When the magnetic field and holding force drops, the spring initiates return movement. The gap lengthens and creates a reverse snap action closing of the valve.

5 Claims, 5 Drawing Figures

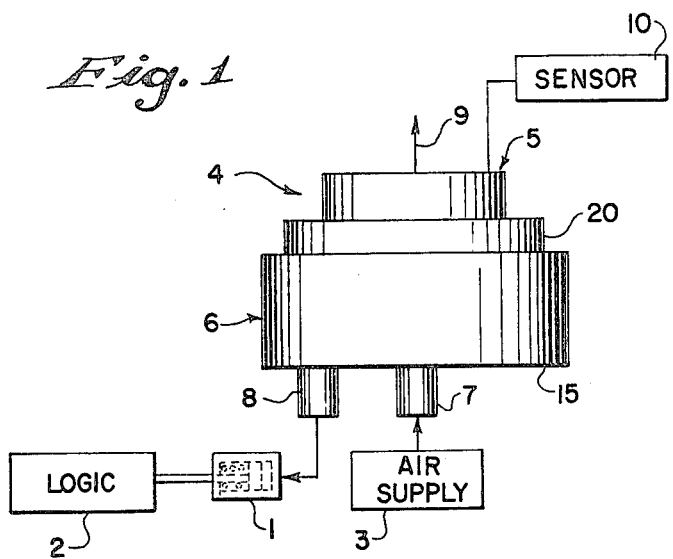
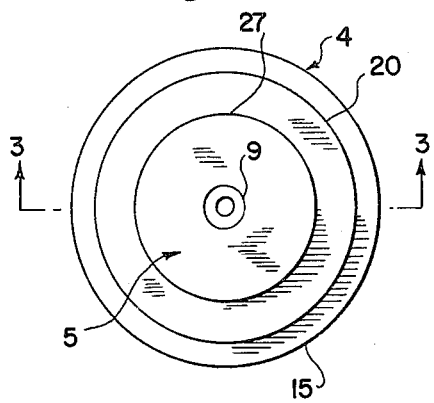
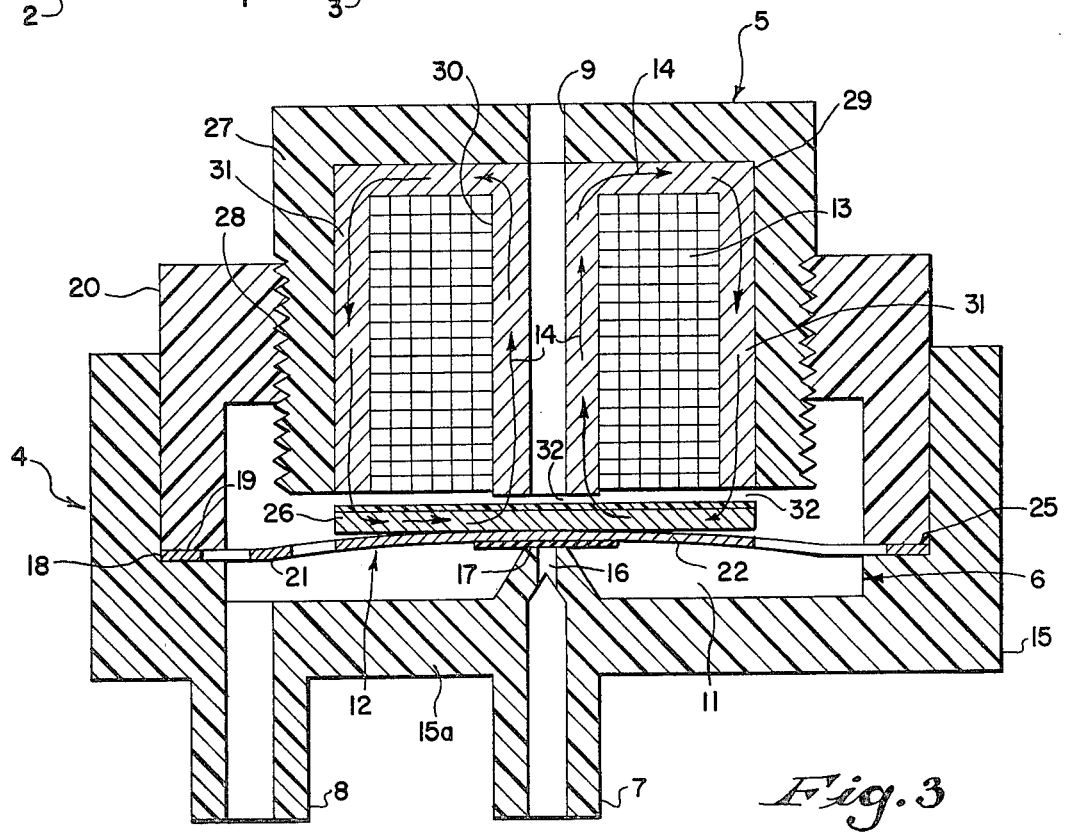
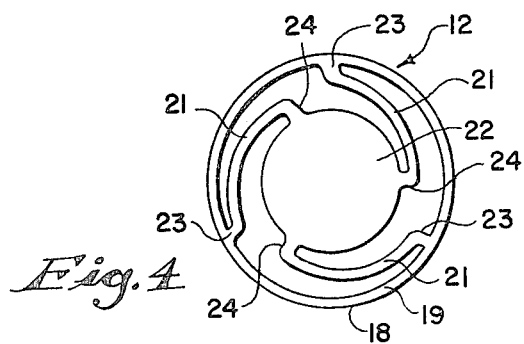
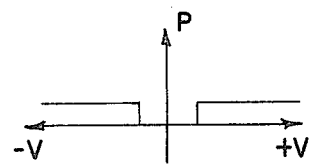

ELECTRIC TO FLUID SIGNAL VALVE UNIT

BACKGROUND OF THE INVENTION

This invention relates to an electric to fluid signal valve unit for generating of a fluid signal related to an electrical signal and particularly to such a unit for forming a digital fluid signal.

In many control systems, various conditions are conveniently sensed with electrical sensing devices. Control operators may advantageously, in many cases, be hydraulic and/or pneumatic devices, with suitable transducers employed to interface the electrical sensors to the control operators. Such operator devices may include a mechanical valve coupled to an operating solenoid. They are, generally, relatively large and require significant power for operation and there is a significant demands for miniaturization in valve structures in which a small electrical signal may control signal flow.

For example, with the development of fluidic systems, low level, digital fluid signals may be employed. In such systems, a low level on-off fluidic signal may signal and control a relatively large flow control device. Thus, the fluidic system replaces the usual power consuming electrical amplifying systems.

Generally, in a fluid system, in addition to being rapid acting, the signal transducer should produce a very positive on-off characteristic with essentially no leakage. A substantial number of interfacing devices may also be required in any one system and the unit should have a minimum cost, operate at relatively low pressures and flow rates and with reliable, accurate outputs. The electrical operating system should also be designed for low power consumption and a minimum size in order to minimize the size of the overall structure.

SUMMARY OF THE PRESENT INVENTION

The present invention is particularly directed to a small, low-powered, electric to fluid signal valve means particularly adapted for incorporation into a fluid control system. Generally, in the present invention, a flat spring means having a minimal spring rate is secured in overlying relation to a port means. An electromagnetic means is secured to the backside of the spring means and is operable to attract the spring means and rapidly open the port means to produce a binary or on-off type signal. The spring means preferably is a flat, disc-like element such as disclosed in U.S. Pat. No. 3,662,779 to U. Weber et al. Such a flat spring includes a plurality of spring arms joining an outer mounting portion with a central sealing portion, formed with a sealing means and biased by the spring arms to a predetermined closing engagement with the port means. In a practical and unique embodiment of this invention, the web spring is clamped about the periphery with the sealing disc located between a power or supply orifice and an exhaust orifice and located in engagement with one of the orifices. A rigid magnetic member is secured to the backside of the spring disc to form a functioning part of the electromagnetic unit. The electromagnetic coil may be wound about the exhaust port and is operable when energized to create a magnetic field which magnetically attracts the spring and particularly the central disc portion and magnetic member. This reverses the position of the disc and the connection of the output port, such as to open the supply port while closing the exhaust port, and permitting a relatively high pressure flow through the valve unit. A very slight deflection is required while establishing the desired return spring force. Further, the web-like disc or spider spring creates a relatively small mass which, in combination with the small deflection, provides relatively rapid response with low power consumption to provide a true snap-action response. This, of course, adapts the unit to low voltage application and to solid state control systems. For example, when the magnetic force applied by the electromagnet reaches a selected level, a magnetic field of sufficient strength to move the web spring is created. The initial movement of the web spring shortens the air gap and thus provides snap action movement of the spring in the direction of the electromagnet. This establishes a free-flow path through the valve. As soon as the excitation decreases below a selected magnetic holding force, the spring initiates movement to the close position. The slight increase in the gap length accelerates and, of course, reduces, increasing the holding force and the net effect is a reverse snap action closing of the valve.

Generally, in accordance with a preferred and unique feature and construction of the present invention, a web-like spring is formed from a suitable spring material which may be of a magnetic or non-magnetic material. The continuous central portion may be coated with a thin layer of sealant such as silicon rubber. The web spring is clamped about its periphery within a cup-shaped valve body having a centrally located port having a flat end face. The valve body is closed by an electromagnetic assembly sealed to the open end of the valve body or unit. The port end face is located with respect to the clamping means to stress the arms and create a firm seating of the spring disc on the end face to create seal with essentially zero leakage. A rigid magnetic member is secured to the back of the spring disc and creates a constant working air gap to the electromagnetic assembly.

The electromagnetic assembly in a unique construction is formed with an E-shaped magnetic core having three legs of essentially equal length and with a slightly protruding central leg aligned with the center of the spring. The exhaust port is formed within the central leg. The magnetic pad is provided on the backside of the spring and is spaced slightly from the E-shaped core to define a short working gap between the core and the pad. The pad provides a relatively large cross-sectional flux path and contributes to the rapid snap action response of the system. This construction is particularly significant in producing a highly satisfactory binary logic signal particularly adapted for fluidic systems.

Further, in accordance with a further significant aspect of the present invention, the housing elements are formed as extruded plastic, including the generally cup-shaped base member having a centrally located port and an outer annular plastic ring clamping the spring against a clamping ledge of the base member. The electromagnetic unit includes a plastic support housing adjustably mounted within the ring for locating of the core relative to the pad and spring.

Applicants have found that the present invention in the optimum construction of flat spring and disc magnetic members provides an improved snap action response with the pressure essentially varying instantaneously between the supply pressure and zero or reference on the output side.

The present invention provides a simple, reliable and effective electric to fluid signal transducer or valve unit which is particularly adapted to commercial production.

BRIEF DESCRIPTION OF THE DRAWING

The drawing furnished herewith illustrates the preferred construction of the present invention in which the above advantages and features are clearly disclosed as well as others which will be readily understood from the following description of the illustrated embodiments of the invention.

In the drawing:

FIG. 1 is a side elevational view of an electric to fluid valve unit constructed in accordance with the present invention and connected in a control system;

FIG. 2 is a top plan view of the valve unit shown in FIG. 1;

FIG. 3 is a vertical section taken generally on line 3—3 of FIG. 2;

FIG. 4 is a plan view of the spring unit shown in FIG. 3; and

FIG. 5 is a graphical representation of the state of the valve unit shown in FIGS. 1-4.

DESCRIPTION OF THE ILLUSTRATED EMBODIMENT

Referring to the drawings and particularly to FIG. 1, a piston operator 1 is shown coupled to position a load device 2. The piston operator 1 is connected to a suitable fluid source 3, shown as a pneumatic supply, by an electro-responsive fluid valve unit 4 constructed in accordance with the present invention. The valve unit 4 includes an electric actuator 5 coupled to a 3-way valve 6 having an input port 7 connected to the supply 3, an output port 8 connected to operator 1 and an exhaust port 9. A digital signal source or sensor means 10 of any suitable construction is connected to the actuator 5. The actuator 5 positions the valve 6 to connect the piston operator to full supply pressure of source 3 or to exhaust and thereby creates a full on or full off positioning of the load device 2.

The present invention is particularly directed to the construction of a novel electric to fulid valve unit 4 which may be employed in any fulid signalling system and is particularly adapted in its preferred construction to incorporation into a binary logic fluidic control system.

Referring particularly to FIG. 3, illustrated valve 6 of the present invention is generally a diaphragm type operator with the input port 7 terminating within a chamber 11. The output port 8 provides an output connection from the load chamber 11. The port 7 is normally closed by a web disc spring unit 12. The electric actuator 5 is an electromagnetic type and is secured to the opposite side of the web spring unit 12. The actuator includes an operating coil 13 connected to signal sensor 10. When energized, a magnetic field 14 is created, attracts the web spring unit 12 opening the port 7 and permitting transfer of fluid pressure to the output port 8 and, thus, to the piston operator 1. In the de-energized state, the web spring unit 12 closes the port 7. The exhaust port 9 serves to exhaust the fluid trapped between the piston operator 1 and the now closed port 7, which resets the standby position.

Thus in the illustrated embodiment of the invention, the electromagnetic unit acts as a two-way valve for controlled alternate positioning of the piston operator 1.

More particularly, in the illustrated embodiment of the invention, the valve unit 4 includes a generally cup-shaped base member 15 having the input port 7 in the form of a nozzle integrally located centrally of the base wall 15a. The port 7 includes an orifice 16 which terminates in a flat inner wall 17.

The web spring unit 12 overlies the wall 17 and, in particular, includes a spring member 18 having an outer peripheral portion 19 fixed to the cup-shaped base member 15. An annular clamping member 20 is press-fitted or otherwise firmly secured within the cup-shaped member 14 and abuts the peripheral portion 18 of spring unit 12 to firmly clamp the unit within the housing.

As more clearly shown in FIG. 4, the spring member 18 of spring unit 12 is a generally flat, circular metal spring having the outer peripheral portion 19 connected by a plurality of similar spider spring arms 21 to a central sealing disc 22. Each of the arms 21 is similarly constructed with a short, radial portion 23 connected to the clamping ring portion 19, an arm portion curving circumferentially and inwardly toward a central sealing disc 22 and being joined thereto by generally short, radial portion 24. The arms 21 are equicircumferentially spaced about the disc and each spans slightly less than one-third of the total circumferential dimension of the disc 22.

As shown in FIG. 3, the web spring 18 is mounted under tension by offsetting of the plane of clamping ledge 25 in the base member 15 with respect to the flat end face or wall 17 of the port 7. Thus, the spring arms 21 are deflected and placed in tension. The central disc 22 firmly engages the flat face 17 of the nozzle 7 and establishes a firm, reliable, leakproof sealing of the source connection.

A rigid pad 26 of suitable magnetic material, such as iron, is secured to the opposite side of the disc 22 and projects radially, outwardly therefrom. The magnetic pad 26 maintains a relative parallel positioning as a result of its self-supporting rigid condition and defines a flat plate-like member to the backside of spring unit 12 and forming a part of the electromagnetic unit 5.

In the illustrated embodiment of the invention, the electromagnetic unit 5 includes an inverted cup-shaped coil holder 27 which is adjustably mounted within the annular clamping member, as by a threaded connection 28. The threaded connection 28, while adjustable, provides a fluid-tight joint. An E-shaped iron core 29 is supported within the coil holder 27 with the three legs or arms projecting from a base portion to the open end of the coil holder. The central leg 30 protrudes slightly from holder 27 and the exhaust opening 9 extends through the leg and the base of the coil holder 27. The exhaust opening is thus aligned centrally of the valve unit 4, and with the orifice 16 closed, provides for exhaust of fluid from the chamber 11 and operator 1. The operating coil 13 is wound about the central leg 30 of the E-shaped core 29. When the coil 13 is excited, the magnetic field 14 is created within the central leg 30 and extends to the opposite sides, passing through the base position and each of the outer legs 31 and returning through the iron pad 26 and the air gaps 32 between the outer legs 31 and the iron pad 26. The magnetic field, shown by lines 14, attracts the iron pad 26 to the E-core 29.

The magnetic field force must rise to some level dependent on the mass and on the spring characteristic of the spring arms 21 to initiate movement of the spring unit 12. When sufficient voltage is applied to the coil 13 to initiate such movement, the air gaps 32 will shorten slightly, thereby reducing the magnetic force required to further move the spring unit 12. Consequently, the web spring unit 12 moves with a snap action, rapidly opening the input port 7 and supplying full pressure to the piston operator 1. Simultaneously, pad 26 abuts and engages the inner end of leg 30 to close the exhaust passageway or port 9. The supply pressure source 3 rapidly builds within the chamber 11 and is transmitted to the operator 1. Chamber 11 may be relatively small such that a practical, instantaneous, full pressure is transmitted to operator 1. As the excitation level of the signal to the coil decreases, the web spring unit 12 holds the valve open as the zero or minimal air gap 32 between the iron pad 26 and the core 29 requires a small holding force. When the intensity of the magnetic field drops to selected level, the spring force is such as to overcome the magnetic force. The iron pad 26 then moves slightly from the ends of the core legs 31. The air gap 32 increases the required magnetic force to maintain balance. As a result, the spring force dominates and the web spring unit 12 snaps to close the orifice 16, thereby cutting off the pressure supply and simultaneously opening the exhaust port 9 to establish a reference or zero pressure supply to the piston operator 1.

The above characteristic of the valve unit 12 is diagrammatically represented in FIG. 5 in which the output pressure switches between reference or zero and supply pressure at a selected direct current signal voltage, of either polarity.

Applicants have found that the structure can be made exceedingly small. For example, in a practical embodiment, the valve unit 4 had a diameter on the order of 0.875 inches and a total depth between the base of the cup-shaped valve body member 14 and the electro-coil holder 27 on the order of 1.187 inches and a gap on the order of 0.06 inches.

As illustrated in the preferred embodiment of the invention, the web spring 18 is mounted under tension as shown in FIG. 3. Both the spring 18 and the iron pad 26 are preferably also provided with outer, exterior faces of a suitable sealant such as a silicone rubber 17. This establishes a highly reliable and positive sealing of the input orifice 16 of the input port 7, resulting in zero leakage while maintaining a rapid response to an electrical signal. The use of the central, parallel sealing portion or disc 22 with the rigid pad 26 creates a firm closure such that a highly effective fluid seal of the, respective, orifices or ports is created.

The non-magnetic or magnetic spring 18, in combination with the auxiliary iron pad 26, provides a highly efficient spring and magnetic system. The thin spring 18 is selected of a material and thickness to create the desired spring characteristic and snap action response.

In the preferred construction, the web spring is formed as a flat member of a thin, non-magnetic material, such as beryllium copper and which may be 0.005 inches in thickness. This will provide the desired spring characteristics. A flat spring member is also readily adapted to suitable conventional manufacturing techniques. The pad 26 is selected of a material and thickness to create a highly efficient and desired magnetic path for producing accurate and positive response of the system.

Further, by manufacturing the valve unit 4 with plastic body or housing portions, simple, reliable and inexpensive elements are formed which can be readily mass produced. The simplicity of the components and system also contributes to a minimal cost with mass production techniques and provides a device which is highly practical for commercial usage as an interface device in fluidic systems and the like.

The present invention thus provides an improved, miniaturized electrical to pressure transducing valve unit which can operate with low power consumption, produce digital or on-off fluidic signals in response to a corresponding low-powered electrical digital signal.

Various modes of carrying out the invention are contemplated as being within the scope of the following claims, particularly pointing out and distinctly claiming the subject matter which is regarded as the invention.

We claim:

1. A miniaturized electric to pressure transducing valve apparatus, comprising a valve chamber unit having a supply nozzle terminating in an inner flat face within a chamber, a planar ledge encircling the nozzle and being parallel to the said flat face, said ledge being inwardly offset from the plane of said flat face, a flat disc spring including an outer peripheral portion secured to said ledge and having a plurality of circumferentially and radially extending arms interconnected to an integral central sealing disc, said central sealing disc abutting said flat face of said nozzle with said spring arms in tension, a rigid magnetic pad firmly affixed to the spring disc opposite said nozzle, an electric coil means adjustably mounted to said chamber unit, said coil means including a multiple legged core having spaced outer legs, an exhaust opening port aligned with said orifice to the opposite side of the disc member, said pad spanning the outer legs, and wherein said chamber unit incudes a cup-shaped base member having an outer cylindrical wall and said supply nozzle is a central nozzle terminating in an inner flat face with an orifice extending outwardly from said flat face, said cup-shaped member having an outer annular ledge adjacent said wall forming said planar ledge, said flat disc spring including an outer annular periphery portion resting on said ledge, an angular clamping ring member secured within said cup-shaped housing and abutting said annular peripheral portion of said spring to rigidly clamp the spring within the housing with the central disc portion abutting said flat face of said orifice with said spring arms in tension.

2. The valve apparatus of claim 1 wherein said coil means includes a coil holder adjustably mounted within said annular clamping ring member, said core being an E-shaped core mounted within said coil holder and having a central leg aligned with said orifice and oppositely located outer legs, said outer legs and coil holder terminating in a common plane, said central leg protruding slightly from said common plane and having an opening extending throughout the length of said leg to form said exhaust opening, said coil holder having an opening aligned with said opening in the leg of the E-shaped core, said rigid magnetic pad being an iron pad spanning the outer legs of said E-shaped core.

3. In the valve apparatus of claim 1 wherein the total depth of the valve unit is on the order of 0.06 inches.

4. A miniaturized electric to pressure transducing valve apparatus, comprising a valve body including a cup-shaped base member having a central nozzle terminating in an inner flat face with an orifice extending outwardly from said flat face, said cup-shaped member having an outer annular planar ledge located parallel to the said flat face and spaced toward the base of the cup-shaped member, a flat disc spring formed of a spring metal and including an outer annular periphery portion resting on said ledge and having a plurality of circumferentially and radially extending arms interconnected to an integral central sealing disc, a cylindrical clamping ring fixedly secured within said cup-shaped housing and abutting said peripheral portion of said spring to rigidly clamp the spring to said ledge within the housing with the central disc portion abutting said flat face of said orifice with said spring arms in tension, an iron pad firmly affixed to the spring disc opposite said nozzle, a coil holder threadedly mounted within said annular clamping ring, said base member, said ring and said coil holder being formed of plastic, an E-shaped core mounted within said coil holder and having a central leg aligned with said orifice and diametrically oppositely located outer legs, said central leg having a cross-sectional flux conducting area corresponding to the flux conducting area of the two outer legs, said outer legs and coil holder terminating in a common plane, said central leg protruding from said common plane and having an opening extending throughout the length of said leg, said coil holder having an opening aligned with said opening in the central leg of the E-shaped core, said iron pad spanning the outer legs of said E-shaped core to bridge the space to the central leg.

5. In the valve apparatus of claim 4 wherein the total depth of the valve unit is on the order of 0.06 inches.

* * * * *